Figure 2:
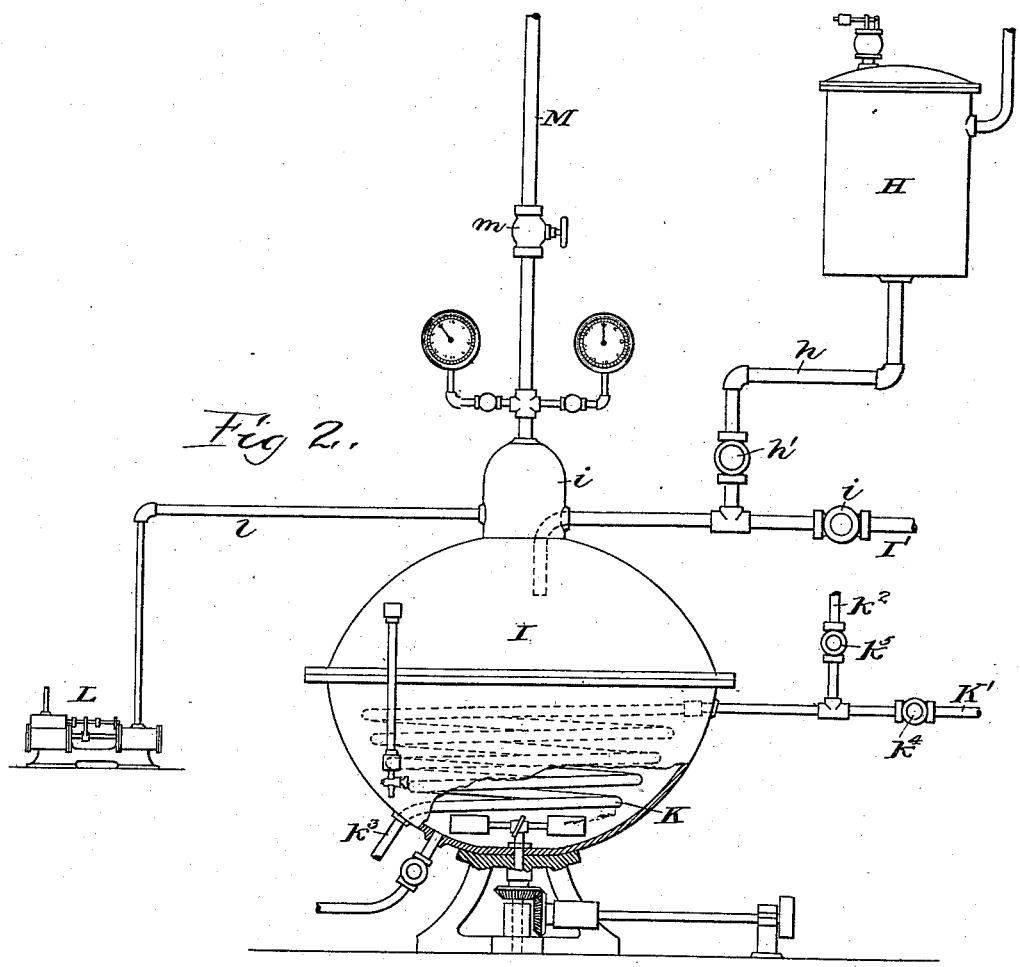

(No Model.) 2 Sheets—Sheet 1.
G. SOBOTKA & A. KLIEMETSCHEK.
METHOD OF MANUFACTURING BEER OR ALE.
No. 553,269. Patented Jan. 21, 1896.
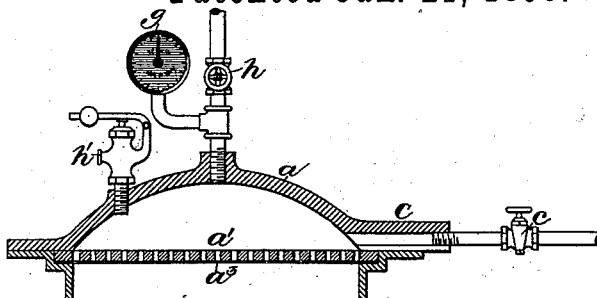
Fig 1.
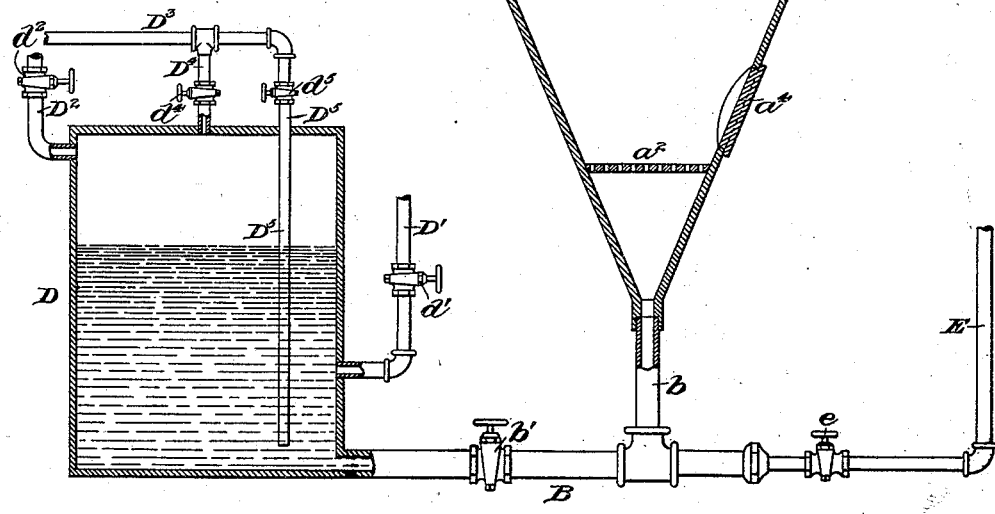
Witnesses
C. W. Smith
Chas. E. Riordon
Inventors
Gustave Sobotka
Adolph Kliemetschek
By Butterworth & Dowell
Attorneys (No Model.) 2 Sheets—Sheet 2.

G. SOBOTKA & A. KLIEMETSCHEK.
METHOD OF MANUFACTURING BEER OR ALE.

No. 553,269. Patented Jan. 21, 1896.

Witnesses
C. W. Smith
Charles E. Riordon

Inventors
Gustav Sobotka
Adolph Kliemetschek
By Butterworth & Dowell, their Attorneys.

UNITED STATES PATENT OFFICE.

GUSTAVE SOBOTKA, OF NEW YORK, N. Y., AND ADOLPH KLIEMETSCHEK, OF BALTIMORE, MARYLAND.

METHOD OF MANUFACTURING BEER OR ALE.

SPECIFICATION forming part of Letters Patent No. 553,269, dated January 21, 1896.

Application filed January 26, 1895. Serial No. 536,376. (No specimens.)

*To all whom it may concern:*

Be it known that we, GUSTAVE SOBOTKA, residing at New York, in the county of New York and State of New York, and ADOLPH KLIEMETSCHEK, residing at Baltimore, in the State of Maryland, citizens of Austria-Hungary, have invented certain new and useful Improvements in Methods of Manufacturing Beer or Ale; and we do hereby declare the following to be a full, clear, and exact description of the invention, such as will enable others skilled in the art to which it appertains to make and use the same.

This invention relates to methods of manufacturing beer and ale, and the objects are mainly to provide an improved process whereby a superior quality of beer or ale may be produced and in a much shorter time than is required when made according to methods heretofore in use, thereby effecting a saving of both time and labor, and also to avoid the loss of the aromatic principle or constituents of the hops, which necessarily results from ordinary methods of boiling the hops with the wort in the copper, and further to reduce the quantity of hops usually required for the manufacture of a given quantity of beer or ale by utilizing the flavoring, disinfecting, and preserving qualities of the hops to better advantage, and thereby also effect a saving of material.

The invention will first be hereinafter described, and then particularly pointed out in the claims at the end of the description.

In practicing our invention we preferably treat the hops in the manner hereinafter described, so as to produce from a given quantity of material two solutions, one of which contains a large per cent. of the aromatic principle of the hops, and which we term "extract No. 1," and the other a small per cent. of the aromatic principle, but a large per cent. of tannin, this second extraction being called "extract No. 2." The latter extract we use for treating the mash in the mash-tub so as to precipitate the albumen, and the former we use for mixing with the wort as the latter runs out of the filtering-press or in a closed receiver.

According to previous methods of manufacture, the worts from the mashing process, after filtration and before being subjected to fermentation, are boiled with hops, the object thereof being principally to preserve and flavor or impart aroma to the beer; but in all ordinary brewing operations as heretofore conducted a considerable loss of the volatile constituents of the hops results from the boiling of the hops with the worts, which is usually done from three to three and one-half hours in an open pan or kettle, so that a large part of the valuable volatile aromatic constituents passes off with the vapor. To supply this loss an additional quantity of hops is necessary, it being the usual practice to add from one-third to one-half of the entire quantity used at the commencement of the boiling to furnish the requisite tannin for precipitating the albumen. The aroma of this portion of hops is lost during the boiling, and to make good this loss an additional quantity or the remaining portion of the given quantity of hops is added to the wort but a short time before the boiling ceases, in order that the aromatic principle in this addition of hops may not also be lost; but it is obvious that in boiling the remaining portion of the hops for only a short time only a small part of the valuable constituents thereof can be extracted, so that there is a further loss of valuable matter, particularly lupulin, and the requisite boiling also results in a further vaporization and loss of the aromatic principle. Moreover, the valuable constituents or active principles of the hops are of such different chemical natures that by the usual processes of boiling now practiced in the operation of brewing they are only partly and incompletely extracted and utilized to advantage. All this inconvenience and loss are intended to be overcome by our invention.

We are aware, however, that it has also been proposed to produce an infusion of hops by boiling the hops or pouring boiled wort upon the hops instead of boiling the hops with the wort, as in the former methods referred to, the hops so treated being then boiled with the wort and the previously extracted infusion being subsequently added when cool to the cooled wort; but our process differs very materially from the last mentioned method in that, instead of extracting an infusion of hops after the manner just explained for adding to the wort when cool and boiling the hops thus treated with the wort, we dispense altogether with the boiling of the wort with the hops by first extracting in a tightly-closed vessel a solution of hops rich in the aromatic or flavoring principle of the hops, and then extracting from the hops thus treated a second solution, which second solution is deprived largely of the aromatic principle but contains a large per cent. of tannin and the preservative constituents, this second extract being added to the mash, while the first extract is added to the clear wort. The addition of the second extract to the mash has a preservative effect thereon and at the same time prevents the production of too much lactic acid, while effecting the precipitation of the greater part of the albumen, so that when the mash is filtered a clear and superior quality of wort is produced which, by reason of its having been deprived of the albumen in the first instance, dispenses with the necessity for boiling in the copper, as required in practicing the usual methods, and the first extract solution, containing a large per cent. of the aromatic principle or flavoring matter, is added to the wort while hot and in a closed receiver, so that all the valuable constituents of the hops are utilized to the best advantage without the loss of any of the valuable substances, particularly the aromatic principle or flavoring matter of a volatile nature, thus producing beer or ale of a superior quality in a much shorter time and with less labor and by the use of a smaller quantity of hops than is possible by following ordinary methods.

In the accompanying drawings, Figure 1 represents a vertical sectional elevation of one form of apparatus we may employ for preparing the hop extracts. Fig. 2 is an elevation of a wort-receiver and apparatus connected therewith, such as may be employed in connection with the hops-extract apparatus shown in Fig. 1 in carrying out the process.

Referring to Fig. 1, A denotes a cylinder or other suitably-shaped vessel of iron or copper, having a tightly-fitting cover $a$. Within the cylinder are arranged the perforated partitions $a'$ and $a^2$, the former preferably having a covering of flannel $a^3$ for filtering purposes and clamped between the cover $a$ and an outwardly-extending flange on said cylinder. The partition $a^2$ is arranged near the lower portion of the cylinder and serves as a support for the material which is placed within the cylinder, and has located above the same a manhole or door $a^4$ arranged in the casing of the cylinder for the purpose of removing the residuum of the hops when it is desired to clean the vessel.

Above the partition is a discharge-pipe C, having a controlling-valve $c$ for regulating the discharge of the extract. The lower portion of the cylinder has a pipe $b$ leading therefrom and connected to the pipe B, the latter pipe being connected to a tank or vessel D near the bottom thereof and having a controlling-valve $b'$ arranged between the pipe $b$ and the vessel D. This vessel has a water-supply pipe D' with a valve $d'$ arranged to fill said vessel when desired. At $D^2$ is an air-escape pipe, having a controlling-valve $d^2$.

$D^3$ is a steam-pipe having the two downwardly-projecting pipes $D^4$ and $D^5$, the latter having a valve $d^5$ for allowing the steam to pass below the surface of the water to heat the same to a boiling temperature. The pipe $D^4$ has a valve $d^4$ adapted to produce a pressure of steam upon the surface of the water, after the same has been heated, for the purpose of forcing said water into the cylinder A when the valves $d^4$ and $b'$ are opened, the other valves $d'$, $d^5$ and $d^2$ remaining closed.

The cylinder A has arranged upon its cover a gage $g$ and a cock $h$ for the escape of air, and a safety-valve $h'$.

In using this apparatus the cylinder A is filled with hops by removing the cover $a$ and perforated partition $a'$, and after again securing same to the cylinder hot water is introduced through the pipe B, as described, for the purpose of scalding the hops, the air having an escape through the cock $h$ of said cylinder. The hops and water are permitted to remain at rest for about one-half hour, after which the extract solution is filtered off through pipe C by opening valves $c$, $d^4$, and $b'$, so as to admit steam under pressure through the vessel D. The clear extract solution filters through the filtering cloth or medium and perforated partition $a'$ and passes through the pipe C while still in a warm or heated condition, and is conducted either direct into the wort or into a suitable vessel provided therefor, to be subsequently added to the wort while still hot. This extract we term "No. 1," and it is used for mixing with the wort as the latter runs out of the filtering-press or in a closed receiver. To prepare the extract No. 2 the hops are now boiled with the water remaining in the cylinder A after the first extraction by forcing steam through the pipe E and valve $e$ for about fifteen minutes, whereupon the liquid is again filtered, thus obtaining extract solution No. 2. This extract may be collected in any suitable receptacle therefor, and is used in treating the mash in the mash-tub to precipitate the albumen by causing the components of the hops to combine with the dissolved albumen.

In the production of the wort we may provide a suitable mash by steeping barley-malt, rice, corn, corn-malt, or any one or more of the same in combination with other cereals or substances used in the manufacture of beer. The mash when prepared is raised to the proper temperature to produce saccharification in any proper manner—for example, by means of a cooker, such as is illustrated in a patent heretofore issued to us, No. 470,902, dated March 15, 1892, or by the use of hot water or steam in the manner commonly practiced in breweries in the manufacture of beer. After the saccharification is completed, we add to the mash a certain quantity of the extract solution of hops No. 2, prepared as hereinbefore described, (the quantity of extract to be added being determined by first drawing a sample,) this extract solution being used to precipitate the albumen. The amount of extract used will depend upon the amount of albumen in the mash; but ordinarily the amount is in the proportion of about one part of extract to thirty parts of mash. The strength of the hops extract will vary according to the strength of the beer it is desired to produce. Ordinarily we use one pound of hops in making one gallon of extract No. 1 and a gallon and a half of extract No. 2, and for one hundred pounds of material (corn, malt, &c.) one and one-fourth to three gallons of hops extract No. 1 will be used for the wort. By thus treating the mash—that is, adding the hops extract No. 2 thereto, as stated—the dissolved albumen is precipitated, and care should be taken not to use any more extract of hops than is necessary to precipitate the albumen—that is, to cause the components of the hops to combine with the dissolved albumen, such combination resulting in an insoluble compound which is readily precipitated. The mash thus treated is now filtered for the purpose of extracting the liquid or wort, which may be accomplished in any proper manner—for example, in the manner indicated in our aforesaid patent—by using a filter-press such as is shown in said patent, and the wort is conducted into a suitably-closed receiver, which may be air-tight or hermetically sealed, and wherein the wort may be kept hot until it is desired to cool it. After extracting the wort, the solid constituents of the mash may be returned to the cooker for the purpose of mixing the same with water and boiling under pressure, to be again run through a filter-press so as to extract the liquid therefrom to be used for a second brewing.

The receiver for the clear wort is preferably provided with a coil, which may be used either for steam or the circulation of cold brine therethrough, the former being used for heating the wort and the latter for cooling the same, and is also preferably connected with a vacuum-pump by which the air may be exhausted. When a sufficient quantity of wort has been collected in this receiver, the latter may be connected with a receiver or reservoir in which the extract solution of hops No. 1 has been collected, or it may be connected directly with the pipe C leading from the vessel A, so that the first extract solution of hops may be conducted directly into the wort while the latter is still hot or in a heated condition, and the hot or heated extract of hops is now drawn into the closed receiver so that the contents of the two vessels may be thoroughly mixed. This mixture of clear wort and extract solution of hops No. 1 is allowed to stand for a short time while the receiver is kept closed so that the aromatic principle or constituents of the hops will be kept and retained in the resulting beer or ale.

When a sufficient time has elapsed for cooling, cold brine may be circulated through the coil in the reservoir containing the mixture of hot beer, and at the same time the air-valve with which the latter is provided may be connected with a pipe for the admission of pure and cold air into the receiver.

Any further treatment of the beer will depend upon the desires of the manufacturer or brewer, accordingly as it is desired to use it as lager-beer or beer with top fermentation.

In Fig. 2 of the drawings we have shown one form of apparatus for receiving and treating the wort, such as may be employed in connection with the hops-extract apparatus, Fig. 1, in carrying out the process. H denotes the hops-extract receiver; I, the wort-receiver; K, a coil in the receiver I for the circulation of either steam or cold brine; L, a pump for exhausting the air from the receiver I, and M an air-inlet pipe provided with a suitable valve $m$ whereby pure and cold air may be introduced into the receiver when desired. In the form shown the vacuum-pump L is connected by a pipe $l$ with the dome $i$ of the receiver I. A pipe I′ leads from the filter-press or source of supply of wort into the receiver I, while a branch pipe $h$ leads from the hops-extract receiver H into said main pipe I′, (or it may lead directly into the receiver,) so that the wort and hops extract may be run into the receiver I, said pipes I′ and $h$ being provided with suitable valves $i'$ and $h'$, respectively, for controlling the admission of wort and hops extract to the wort-receiver. A pipe K′, affording communication between the coil K in the receiver I and any suitable source of supply of steam, also communicates by means of a branch pipe $k^2$ with a source of supply of cold brine, whereby either steam or cold brine may be passed through the coil K and out at the discharge end $k^3$ of the coil, said pipes K′ and $k^2$ being provided with suitable valves $k^4$ and $k^5$, respectively, for controlling the admission of steam and cold brine to the circulating-coil.

The admission of air to the receiver I may be controlled by the air-cock or inlet-valve $m$ in the pipe M, or in any proper manner.

We do not in this application make any claim to either form of apparatus hereinbefore described, and it will be understood, of course, that any suitable apparatus may be employed in practicing the invention, the forms shown being such as may be employed with advantage, though various forms of apparatus may be used with good results.

By the foregoing method we effect a saving of time, labor, and material, and produce from a given quantity of material a larger quantity and a better quality of beer or ale, and also a larger quantity of extract solution of hops, than can be obtained by the use of such methods as have heretofore been proposed or in use, utilizing throughout the whole process the disinfecting and preserving qualities of the hops and retaining in the beer the volatile aromatic principle or substances of the hops, which are largely lost in previous methods.

Our process is essentially preservative in its effects from the beginning. Instead of adding hops to the wort and then boiling, with consequent deleterious effects and loss of the aromatic principle of the hops, as in ordinary processes, we provide an extract solution of hops containing a large per cent. of the aromatic principle or substance of the hops and a second extract containing a very small per cent., which latter we add directly to the mash. This helps to preserve the mash and at the same time prevents the production of too much lactic acid; and the tannin contained in the extract has the effect of precipitating the greater part of the albumen, so that on filtering a clearer and better quality of wort is produced, owing to the fact that the albumen is precipitated in the first instance, and the precipitated albumen is thus prevented from being carried along with the wort into the receiver, whereby the necessity for excessive boiling in the copper, according to common methods, is avoided, and the time required in this part of the process is very materially shortened. The first extract, which contains more of the aromatic principle or substance of the hops than the second extraction, is mixed with the liquor or wort in a subsequent step of the process and while in a warm or hot condition, so as not to lose anything and to avoid the necessity for boiling in the copper. In this manner we avoid the loss of the volatile aromatic principle or constituents of the hops resulting from boiling in the copper, and also the loss of wort, a large part of which remains in the hops when treated according to methods in common use, and reduce the time required for the production of beer under existing methods about one-half.

The extract solution of hops No. 2 should be added to the mash after the saccharification is completed, the temperature fluctuating between 55° centigrade and 65° centigrade, according to the material used, and the first solution or extract No. 1, containing a large per cent. of the aromatic principle, is preferably added to the wort after the latter has been kept hot in the closed evacuated reservoir that is exhausted of air.

Having fully described our invention, what we claim as new, and desire to secure by Letters Patent of the United States, is—

1. The improved step in the art of manufacturing beer or ale, which consists in adding to the mash before filtering a warm or hot extract solution of hops rich in tannin, but not in the volatile aromatic principle of the hops, substantially as described.

2. The process of making beer or ale, which consists in providing a suitable mash, raising the temperature of the mash to produce saccharification, then adding to the mash a warm or hot extract solution of hops rich in tannin, next filtering, and finally adding to the wort thus obtained an additional quantity of warm or hot extract solution of hops rich in the aromatic principle of the hops, substantially as described.

3. The process of manufacturing beer or ale, which consists essentially of the following steps, first:—providing a suitable mash, then raising the temperature of the mash to produce saccharification, next adding to the mash an extract solution of hops containing but a small per cent. of the aromatic principle or substance of the hops but rich in tannin, then filtering and conducting the wort into a closed receiver, meanwhile keeping the wort hot, then adding to the wort in this condition a warm or hot extract solution of hops containing a large per cent. of the aromatic principle, substantially as described.

In testimony whereof we affix our signatures in presence of two witnesses.

GUSTAVE SOBOTKA.
ADOLPH KLIEMETSCHEK.

Witnesses:
JOHN W. OUADE,
JAS. A. DONALDSON.